United States Patent
Jung et al.

(10) Patent No.: US 12,446,598 B2
(45) Date of Patent: Oct. 21, 2025

(54) METHOD OF PREPARING GRANULAR FEED ADDITIVE

(71) Applicant: CJ CHEILJEDANG CORPORATION, Seoul (KR)

(72) Inventors: Su Kwon Jung, Seoul (KR); Seung Je Lee, Seoul (KR); In Sung Lee, Seoul (KR); Seok Tae Cho, Seoul (KR); Il Chul Kim, Seoul (KR); Yong Bum Seo, Seoul (KR); Se Hee Jo, Seoul (KR); Jong Hwan Shin, Seoul (KR)

(73) Assignee: CJ CHEILJEDANG CORPORATION, Seoul (KR)

( * ) Notice: Subject to any disclaimer, the term of this patent is extended or adjusted under 35 U.S.C. 154(b) by 482 days.

(21) Appl. No.: 17/908,856

(22) PCT Filed: Jan. 19, 2021

(86) PCT No.: PCT/KR2021/000698
§ 371 (c)(1),
(2) Date: Sep. 1, 2022

(87) PCT Pub. No.: WO2021/182742
PCT Pub. Date: Sep. 16, 2021

(65) Prior Publication Data
US 2023/0103838 A1    Apr. 6, 2023

(30) Foreign Application Priority Data

Mar. 13, 2020    (KR) .......................... 10-2020-0031305

(51) Int. Cl.
*A23K 20/142*    (2016.01)
*A23K 40/10*    (2016.01)

(52) U.S. Cl.
CPC ............ *A23K 20/142* (2016.05); *A23K 40/10* (2016.05)

(58) Field of Classification Search
CPC .............................. A23K 20/142; A23K 40/10
(Continued)

(56) References Cited

U.S. PATENT DOCUMENTS

2007/0160740 A1    7/2007 Lee et al.
2009/0017507 A1*   1/2009 Kushiki .............. A23K 20/142
                                                    435/115
(Continued)

FOREIGN PATENT DOCUMENTS

BR    P10706473-0 A2    3/2011
BR    102015008762-4 A2    2/2019
(Continued)

*Primary Examiner* — Brent T O'Hern
(74) *Attorney, Agent, or Firm* — Seed Intellectual Property Law Group LLP

(57) ABSTRACT

Provided is a method of preparing a granular feed additive. When the method of preparing a granular feed additive according to one exemplary embodiment is used, it is possible to prepare a granular feed additive including a high content of basic amino acids while preventing hygroscopicity and agglomeration caused by the basic amino acids. In addition, since the method of preparing a granular feed additive according to one exemplary embodiment may omit a process of using hydrochloric acid, which is generally used to neutralize basic amino acids, it is possible to simplify the process and to solve process problems caused by the use of hydrochloric acid.

17 Claims, 2 Drawing Sheets

(58) Field of Classification Search
USPC .......................................................... 426/475
See application file for complete search history.

(56) References Cited

U.S. PATENT DOCUMENTS

2018/0116246  A1     5/2018  Shin et al.
2019/0040429  A1*    2/2019  Suzuki .................... C12N 1/20

FOREIGN PATENT DOCUMENTS

| EP | 1 582 101 B1 | 1/2009 |
| JP | 2003-219807 A | 8/2003 |
| KR | 10-0858828 B1 | 9/2008 |
| KR | 10-0921644 B1 | 10/2009 |
| KR | 10-2012-0130579 A | 12/2012 |
| KR | 10-2019-0081448 A | 7/2019 |
| KR | 10-2020-0001407 A | 1/2020 |
| KR | 10-2020-0073298 A | 6/2020 |
| WO | 2013/167659 A1 | 11/2013 |

* cited by examiner

[FIG. 1]
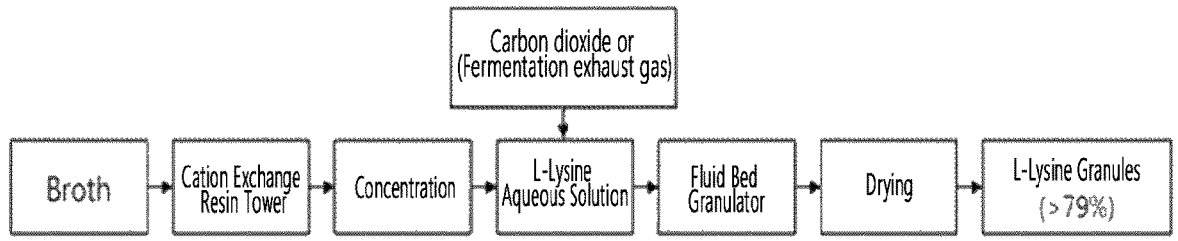
[FIG. 2]
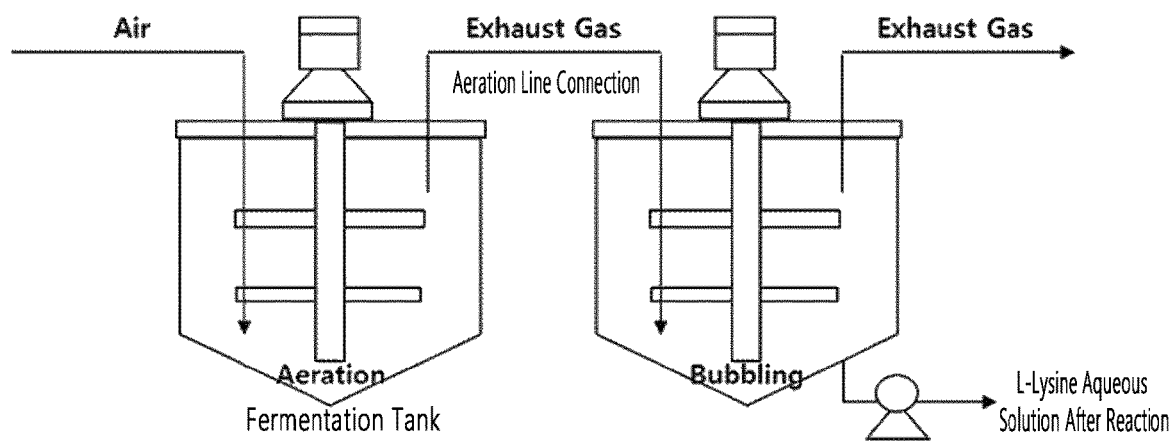
[FIG. 3]
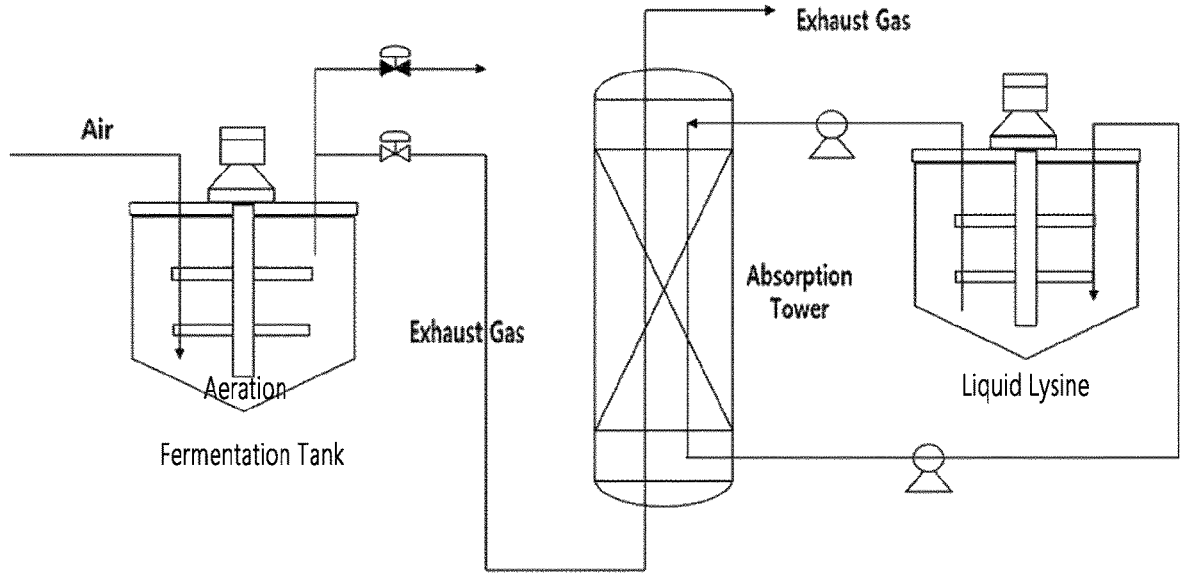

[FIG. 4]
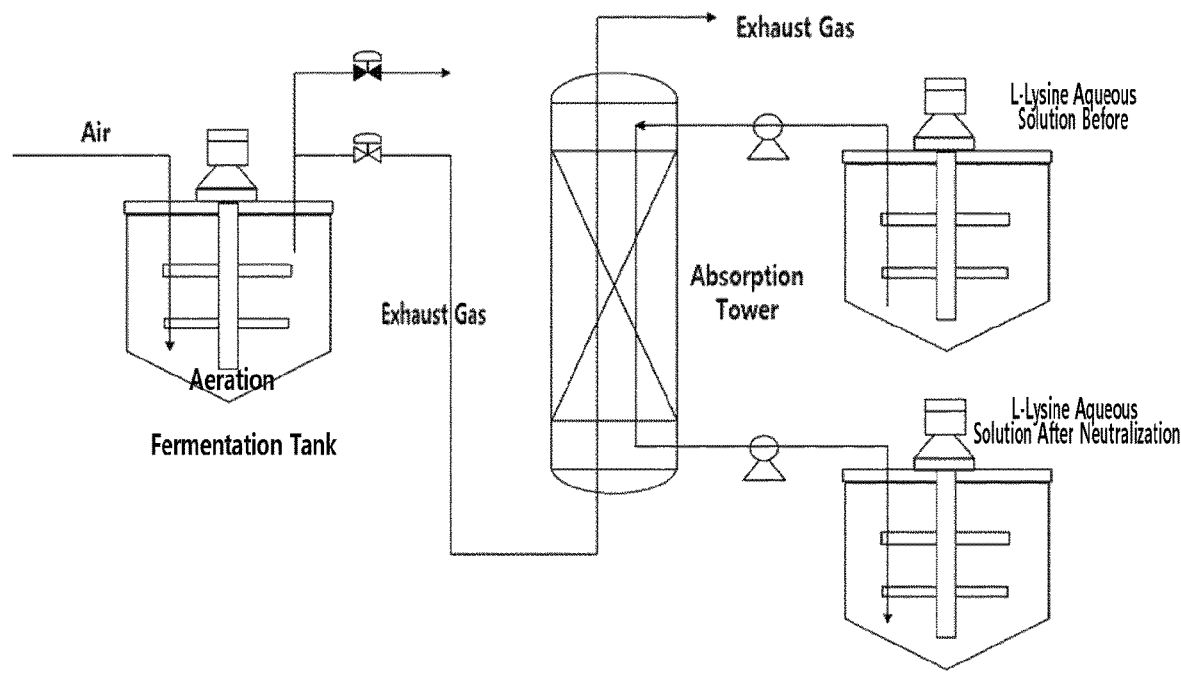

METHOD OF PREPARING GRANULAR FEED ADDITIVE

BACKGROUND OF THE INVENTION

1. Field of the Invention

The present disclosure relates to a method of preparing a granular feed additive.

2. Description of the Related Art

A feed additive is a product intended to be fed as a supplement to the normal diet to overcome the lack of daily intake of a specific compound. It is common to supplement feed additives for farm animals with amino acids to improve animal performance in animal husbandry.

Since amino acids for feed additives which are produced by microbial fermentation exist together with other by-products in a broth, various methods are used to increase the content of amino acids during the preparation of feed additives. For example, to increase the content of amino acids, an amino acid aqueous solution purified at a high concentration is mixed with a fermentation broth to prepare granules. However, since a high-content basic amino acid aqueous solution has hydrophilic and polar characteristics, the final granular products have high hygroscopicity, which causes agglomeration of the granules. This agglomeration phenomenon is not suitable for a processing process which is technologically required in a mixed feed factory. In addition, to increase the content of basic amino acids, a number of purification processes to remove impurities in the fermentation broth and a crystallization process with hydrochloric acid are also used. However, a number of purification processes are required, and reagents essentially used are discharged as waste, which causes economic and environmental problems.

Accordingly, it is necessary to develop an economical method of preparing a granular feed additive composition including basic amino acids with a high content and low hygroscopicity.

PRIOR ART DOCUMENT

Patent Document (Patent Document 0001) Korean Patent Publication No. 10-2019-0081448

SUMMARY OF THE INVENTION

An object of the present disclosure is to provide a method of preparing a granular feed additive, the method including the steps of preparing a basic amino acid aqueous solution (step a); and injecting carbon dioxide into the basic amino acid aqueous solution to prepare a neutralized amino acid aqueous solution (step b), wherein the basic amino acid aqueous solution is prepared from a fermentation broth obtained from microbial culture.

BRIEF DESCRIPTION OF THE SEVERAL VIEWS OF THE DRAWINGS

FIG. 1 illustrates the step of preparing a granular feed additive including a high content of basic amino acids according to an aspect;

FIG. 2 illustrates a method of neutralizing an amino acid aqueous solution using a bubbling tower;

FIG. 3 illustrates a method of neutralizing an amino acid aqueous solution using a circulating absorption tower; and FIG. 4 illustrates a method of neutralizing an amino acid aqueous solution using a continuous absorption tower.

DETAILED DESCRIPTION OF THE PREFERRED EMBODIMENTS

Each description and embodiment disclosed in this disclosure may also be applied to other descriptions and embodiments. That is, all combinations of various elements disclosed in this disclosure fall within the scope of the present disclosure. Further, the scope of the present disclosure is not limited by the specific description described below.

An aspect of the present disclosure may provide a method of preparing a granular feed additive, the method including the steps of preparing a basic amino acid aqueous solution (step a); and injecting carbon dioxide into the basic amino acid aqueous solution to prepare a neutralized amino acid aqueous solution (step b), wherein the basic amino acid aqueous solution is prepared from a fermentation broth obtained from microbial culture.

According to the method of preparing a granular feed additive according to an aspect, the prepared granular feed additive may include a high content of basic amino acids, in which the basic amino acids may be neutralized by injecting carbon dioxide into relieve polarity of basic amino acids. Accordingly, it is possible to exhibit the effects of reducing an increase in hygroscopicity and a lumping and caking phenomena which are problems caused by the polarity of basic amino acids.

As used herein, the term "feed additive" may refer to a substance which is added to a feed in order to improve productivity or to promote health of a target organism. The feed additive may be prepared in various forms known in the art, and may be used individually or in combination with the existing known feed additives. The feed additive composition may be added to a feed at an appropriate compositional ratio, and the compositional ratio may be easily determined by those skilled in the art in light of common sense and experience in the field. The feed additive composition may be added to a feed for animals such as a chicken, a pig, a monkey, a dog, a cat, a rabbit, a cow, a sheep, a goat, etc., but is not limited thereto.

As used herein, the term "basic amino acid" may be one or more selected from the group consisting of lysine, arginine, and histidine. The basic amino acid may be one or more selected from the group consisting of L-lysine, L-arginine, and L-histidine. The basic amino acid may be in the form of a salt or a free amino acid of lysine, arginine, or histidine. The salt may be a sulfate, hydrochloride, or carbonate, but is not limited thereto. The basic amino acid has a property of easily binding with water, and may be polar.

As used herein, the term "basic amino acid aqueous solution" may refer to a product obtained by purifying a fermentation broth including the basic amino acids. Specifically, the basic amino acid aqueous solution may be obtained by processes of filtering, purifying, and concentrating a fermentation product which is obtained by culturing a bacterial strain producing the basic amino acids.

The fermentation product may be achieved by culturing the bacterial strain by fermentation, and the fermentation may be performed by a fed-batch process (feed process), a batch process, or a repeated fed-batch process (repeated feed process). A fermentation medium to be used may be optimized according to requirements of the production strain.

A concentration of the basic amino acid aqueous solution may be about 450 g/L to about 650 g/L, for example, about 500 g/L to about 600 g/L, or about 520 g/L to about 580 g/L. pH of the basic amino acid aqueous solution may be about 10 to about 11. A specific gravity of the basic amino acid aqueous solution may be about 1.10 to about 1.15. A purity of the basic amino acid aqueous solution may be about 90% by weight to 100% by weight.

The basic amino acid has a property of easily binding with water and may be polar. Therefore, when the granular feed additive includes a high content of basic amino acids, polarity of the granules generally increases to generate problems of increased hygroscopicity and agglomeration. However, the granular feed additive prepared by the above preparation method may include a high content of basic amino acids without the above problems, and the feed additive may have transport and storage advantages by including the basic amino acids in the above-mentioned range. The granular feed additive according to one aspect may include 50% by weight to 90% by weight, for example, about 55% by weight to 89.5% by weight, about 60% by weight to 89% by weight, about 65% by weight to 88.5% by weight, about 70% by weight to 88% by weight, about 75% by weight to 87% by weight, about 76% by weight to 86% by weight, about 77% by weight to 85% by weight, about 78% by weight to 84% by weight, or about 79% by weight to 80% by weight of the basic amino acids, based on the total weight of the granules. According to the method of preparing the granular feed additive, the granular feed additive having the high content characteristic may be prepared by using the amino acid aqueous solution which is obtained by purifying and concentrating the fermentation broth.

In the preparation method, the bacterial strain producing the basic amino acids is not limited to its type, as long as it is able to produce the basic amino acids without departing from the scope of the present disclosure. Specific examples thereof may include strains of the genus *Corynebacterium*.

In addition, the conditions under which the bacterial strain produces the basic amino acids may be conditions under which the production amount of the basic amino acids is high, but the accumulation amount thereof in the bacterial strain is small.

The fermentation product may be filtered, and specifically, microorganisms may be separated therefrom using a membrane. Subsequently, the fermentation broth from which microorganisms are removed may pass through, for example, an ion exchange resin tower, and as a result, impurities may be removed to purify the basic amino acids. The process of concentrating the purified basic amino acids may be performed by concentrating the fermentation broth including basic amino acids through, for example, vacuum and/or drying process.

The "neutralized amino acid aqueous solution" may refer to a neutralized form of the basic amino acid aqueous solution. Specifically, the neutralized amino acid aqueous solution may further include $HCO_3^-$ or $CO_3^{2-}$ in addition to the amino acid aqueous solution. In other words, the neutralized amino acid aqueous solution may be in the form of an amino acid aqueous solution neutralized by $HCO_3^-$ or $CO_3^{2-}$.

In the step of preparing the neutralized amino acid aqueous solution (step b), neutralization may be performed by injecting carbon dioxide into the basic amino acid aqueous solution. The carbon dioxide may include carbon dioxide generated during the fermentation process of microorganisms. Specifically, the carbon dioxide may include carbon dioxide generated in the step of preparing the basic amino acid aqueous solution (step a). When carbon dioxide is injected into the amino acid aqueous solution, $HCO_3^-$ or $CO_3^{2-}$ is included in the aqueous solution, resulting in the effect of neutralizing basic amino acids. According to this method, since carbon dioxide generated during fermentation may be used, carbon dioxide emission may be reduced, and resources may be recycled.

In addition, since a traditional process of using hydrochloric acid for neutralization of amino acid aqueous solutions may be omitted, the purification process may be simplified.

The method of preparing the granular feed additive may further include the step of preparing a concentrated fermentation broth by concentrating the fermentation broth obtained by culturing the microorganism (step a-2), after the step of preparing the basic amino acid aqueous solution (step a).

As used herein, the term "concentrated fermentation broth" may refer to a product obtained by concentrating the fermentation broth including the basic amino acids through vacuum and/or drying processes. The concentrated fermentation broth may be obtained by concentrating the fermentation broth, which is obtained by culturing the bacterial strain producing the basic amino acids, under vacuum and heating without removal of the bacteria and a purification process such that the total solid content in the fermentation broth is about 50% by weight to about 60% by weight, that is, the solid content is about 50% by weight to about 60% by weight. The "solid content" may refer to the weight of the remainder resulting from complete removal of liquid.

In addition, the step a-2 may be performed simultaneously with the step a, after the step a, or before the step a. For example, the method may be to prepare a concentrated fermentation broth by concentrating the fermentation broth without a purification process while preparing a basic amino acid aqueous solution by purifying and concentrating a fermentation broth obtained by culturing a bacterial strain producing the basic amino acids.

The method of preparing the granular feed additive may further include the step of mixing the concentrated fermentation broth and the neutralized amino acid aqueous solution (step b-2), after the step of preparing the neutralized amino acid aqueous solution (step b).

According to one exemplary embodiment, the step of mixing the concentrated fermentation broth and the neutralized amino acid aqueous solution may be performed such that a molar ratio of anions to amino acids is more than about 0.19 and 0.62 or less.

After step b, the method of preparing the granular feed additive may further include the step of mixing the concentrated fermentation broth and the neutralized amino acid aqueous solution (step b-2), thereby more economically improving the purity of amino acids in granules.

In the method of preparing the granular feed additive, the step of preparing the neutralized amino acid aqueous solution (step b) may be performed using a bubbling tower, a circulating absorption tower, or a continuous absorption tower. Specifically, in step b, gas containing carbon dioxide may be injected into the neutralized amino acid aqueous solution using the above device.

When the step of preparing the neutralized amino acid aqueous solution (step b) may be performed using the bubbling tower, it may be performed for about 1 hour or more, for example, 1 hour to 15 hours, 1 hour to 12 hours, 2 hours to 15 hours, 2 hours to 12 hours, 3 hours to 15 hours, 3 hours to 12 hours, 3 hours to 11 hours, or 4 hours to 11 hours, but is not limited thereto, and may be selected within the pH range of the neutralized amino acid aqueous solution from about 8.5 to about 9.5.

When the step of preparing the neutralized amino acid aqueous solution (step b) may be performed using the circulating absorption tower, gas containing carbon dioxide may be injected into the absorption tower at a speed of about 700 L/min to about 1500 L/min.

When the step b may be performed using the circulating absorption tower, it may be performed for about 1 hour or more, for example, 1 hour to 10 hours, 1 hour to 6 hours, 1 hour to 4 hours, or 1 hour to 3 hours, but is not limited thereto, and may be selected within the pH range of the neutralized amino acid aqueous solution from about 8.5 to about 9.5.

In one exemplary embodiment, the circulating absorption tower may be a tray-type absorption tower.

When the step of preparing the neutralized amino acid aqueous solution (step b) may be performed using the continuous absorption tower, gas containing carbon dioxide may be injected into the absorption tower at a speed of about 300 L/min to 1500 L/min, or about 400 L/min to 1200 L/min.

When the step b may be performed using the continuous absorption tower, it may be performed until the neutralized amino acid aqueous solution with predetermined physical properties is discharged in a steady state, and the speed at which the gas containing carbon dioxide is injected may be controlled such that the pH range of the neutralized amino acid aqueous solution is from about 8.5 to about 9.5, or the purity range of the neutralized amino acid aqueous solution is from about 82% by weight to about 89% by weight.

As used herein, the "steady state" is also referred to as a "stationary state", and refers to a constant state in which the state of the material system does not change over time.

The step of preparing the neutralized amino acid aqueous solution (step b) may be performed at about 35° C. to about 65° C., about 40° C. to about 60° C., or about 45° C. to about 55° C.

pH of the neutralized amino acid aqueous solution may be about 8.5 to about 9.5. A specific gravity of the neutralized amino acid aqueous solution may be about 1.18 to about 1.22. A purify of the neutralized amino acid aqueous solution may be about 78% by weight or more, for example, about 78% by weight to about 91% by weight, about 78% by weight to about 89% by weight, or about 80% by weight to about 89% by weight.

The method of preparing the granular feed additive may further include the step of granulating the neutralized amino acid aqueous solution (step c), after the step of preparing the neutralized amino acid aqueous solution (step b).

Further, when the method of preparing the granular feed additive may further include the step of mixing the concentrated fermentation broth and the neutralized amino acid aqueous solution (step b-2) after the step b, the method may further include the step of granulating the mixture of the concentrated fermentation broth and the neutralized amino acid aqueous solution (step c-2), after the step b-2.

The step of granulating (step c or c-2) may be performed by, for example, continuously spraying the neutralized amino acid aqueous solution or the mixed solution into a granulator and continuously supplying hot air so that particles with a predetermined range of size formed by spraying form a fluidized bed. For this process, a general fluidized bed circulating granulator, etc. may be used. Granulation conditions may include, for example, an injection rate of about 5 mL/min to about 10 mL/min, a nozzle pressure of about 1.2 kg/cm², and a temperature of about 75° C. to about 80° C., but are not limited thereto.

In the method of preparing the granular feed additive, the granular feed additive may include the basic amino acid and an anion represented by the following Formula 1, wherein a molar ratio of the anion to the basic amino acid may be more than 0.1 and 0.52 or less:

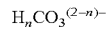   [Formula 1]

(in Formula 1, n is 0 or 1).

The anion represented by Formula 1 may specifically include a bicarbonate ion ($HCO_3$) or a carbonate ion ($CO_3^{2-}$).

The anion may be produced by adding carbon dioxide to the aqueous solution including basic amino acids. Carbon dioxide reacts with hydrogen ions in the aqueous solution to produce carbonate ions, which may be converted into bicarbonate ions. During this process, pH of the granular feed additive composition may be reduced or neutralized. Therefore, according to one exemplary embodiment, the granular feed additive may include the carbonate ion, the bicarbonate ion, or a mixture thereof.

As used herein, the term "molar ratio of the anion to the basic amino acid" may also be expressed as a molar ratio of the bicarbonate ion or carbonate ion to the basic amino acid, $HCO_3$/basic amino acid, or $CO_3^{2-}$/basic amino acid.

When the molar ratio is 0.1 or less, the content of bicarbonate ion or carbonate ion in the granules is lowered, and the neutralizing effect of the basic amino acids is lowered to cause a hygroscopicity or solidification problem of the granules. When the molar ratio is more than about 0.52, there is a problem in that the content of granules is lowered, and the product value is not significantly reduced. In other words, the granular feed additive may have improved hygroscopicity, as compared to granular feed additives without bicarbonate ion or carbonate ion.

As used herein, the term "hygroscopicity" refers to the tendency to absorb or retain water. Since a common granular feed additive, particularly, granular feed additive composition including basic amino acids, has high hygroscopicity, agglomeration increases, and thus the product value decreases. According to the present disclosure, the product value of the feed additive may be improved.

The molar ratio may be specifically about 0.15 to about 0.5, or about 0.2 to about 0.45.

The molar ratio may be calculated according to results obtained through high-performance liquid chromatography (HPLC) after dissolving the granules in water, but is not limited thereto.

The size of the granules included in the granular feed additive may be selected according to animal husbandry use.

According to one exemplary embodiment, the average diameter of the granules may be 0.1 mm to 3.0 mm, and according to another exemplary embodiment, it may be 0.5 mm to 3.0 mm, but variations are possible without departing from the object of the present disclosure. When the average diameter of the granules is less than about 0.1 mm, the degree of solidification may become severe or dust may be generated. When the average diameter of the granules is more than about 3.0 mm, a problem of non-uniform mixing may occur during the preparation of feeds.

The granules may have an irregular shape, for example, a spherical shape.

According to one exemplary embodiment, the content of the basic amino acid may be 50% by weight to 90% by weight, based on the total weight of granules.

The granular feed additive may be suitable for use in the preparation of animal feeds. For example, the feed additive as it is may be mixed, as a part of an animal feed premix or as a precursor of an animal feed, with feed materials.

The granular feed additive may be administered to animals alone or in combination with other feed additives in an edible carrier. In addition, the feed additive may be easily administered to animals as a top dressing, or by directly mixing with an animal feed, or as an oral formulation separately from the feed.

Another aspect may provide a granular feed additive prepared by the method of preparing the granular feed additive.

The granular feed additive is the same as described above.

Hereinafter, the present disclosure will be described in more detail with reference to exemplary embodiments. However, these exemplary embodiments are for illustrative purposes only, and the scope of the present disclosure is not intended to be limited by exemplary embodiments.

Examples 1 to 6 and Comparative Examples 1 to 6.
Preparation of Granular Feed Additive Using Bubbling Tower and Characterization (1)

FIG. 1 illustrates the step of preparing a granular feed additive including a high content of basic amino acids according to an aspect. Hereinafter, each step will be described in detail with reference to FIG. 1.

1. Preparation of Granular Feed Additive
1.1. Preparation of Amino Acid Mixed Solution According to compositions in Tables 1 to 2, amino acid aqueous solutions and concentrated fermentation broths were prepared, and they were mixed to prepare mixed solutions, respectively. In this Example, L-lysine was used as an example of a basic amino acid. First, each amino acid aqueous solution was prepared by purifying a fermentation broth containing L-lysine. For the production of the fermentation broth, a bacterial strain of the genus *Corynebacterium* capable of producing L-lysine was subjected to seed-culture in 25 mL of a seed medium at pH 7.0 at 30° C. at 200 rpm for 20 hours. The seed medium consisted of, based on 1 L of distilled water, 20 g of glucose, 10 g of peptone, 5 g of yeast extract, 1.5 g of urea, 4 g of $KH_2PO_4$, 8 g of $K_2HPO_4$, 0.5 g of $MgSO_4$ $7H_2O$, 100 μg of biotin, 1 mg of thiamine HCl, 2 mg of calcium pantothenate, and 2 mg of nicotinamide. The bacterial seed obtained through the seed culture was inoculated at 4% (v/v) in a production medium at pH 7.0, and cultured with sufficient aeration and agitation at 30° C. until the input glucose was completely consumed to thereby obtain the final fermentation broth. The production medium consisted of, based on 1 L of distilled water, 100 g of glucose, 40 g of $(NH_4)_2SO_4$, 2.5 g of soybean protein, 5 g of corn steep solids, 3 g of urea, 1 g of $KH_2PO_4$, 0.5 g of $MgSO_4$ $7H_2O$, 100 μg of biotin, 1 mg of thiamine hydrochloride, 2 mg of calcium pantothenate, 3 mg of nicotinamide, and 30 g of $CaCO_3$. After the culture was completed, the concentration of L-lysine in the fermentation broth was analyzed using HPLC (Waters, 2478). Microorganisms in the fermentation broth were removed using a membrane having a size of 0.1 μm. In the separation process using the membrane, the pH of the fermentation broth was adjusted to 4.0 and then heated to 50° C. The fermentation broth from which microorganisms were removed was passed through a cation exchange resin tower, and L-lysine in the fermentation broth was adsorbed onto the resin tower to separate L-lysine from other impurities. The adsorbed L-lysine was desorbed from the resin tower using about 2 N ammonia water, recovered, heated in a vacuum, and concentrated to prepare an L-lysine aqueous solution, and when concentrated, the solid material in the aqueous solution was allowed to be 50% by weight to 60% by weight. After concentration, the concentration of the L-lysine aqueous solution was 560 g/L, pH thereof was 10.2, a specific gravity thereof was 1.13, and a purity thereof was 99% by weight.

FIG. 2 illustrates a method of neutralizing the amino acid aqueous solution using a bubbling tower. Hereinafter, each step will be described in detail with reference to FIG. 2.

After 35 kg of the L-lysine aqueous solution was put into a neutralization tank, a gas containing 5% by volume of carbon dioxide was injected at a temperature of 50° C. at 1000 L/min under stirring conditions of 500 rpm for 10 hours. The L-lysine concentration and the bicarbonate ion ($HCO_3^-$) or carbonate ion ($CO_3^{2-}$) concentration in the L-lysine aqueous solution neutralized by carbon dioxide injection were analyzed using HPLC (Waters, 2478). pH of the neutralized L-lysine aqueous solution was 8.9, a specific gravity thereof was 1.20, and a purity thereof was 81.6% by weight.

The concentrated fermentation broth was prepared by heating and concentrating the fermentation broth obtained by culturing the bacterial strain of the genus *Corynebacterium* as described above without removal of the microorganisms and a purification process. After concentration, the total solid content in the fermentation broth was allowed to be 50% by weight to 60% by weight.

The L-lysine aqueous solution or the neutralized L-lysine aqueous solution was mixed with the concentrated fermentation broth according to ratios specified in Tables 1 and 2 to prepare a mixture. The concentrations of L-lysine and $HCO_3^-$ or $CO_3^{2-}$ in the mixture were analyzed using HPLC (Waters, 2478). The results of calculating a molar ratio of $HCO_3^-$ to L-lysine in the mixed solutions of Examples 1 to 6 and Comparative Examples 1 to 6 using the concentration analysis results are shown in Tables 1 and 2, respectively.

TABLE 1

|  | Example 1 | | Example 2 | | Example 3 | |
|---|---|---|---|---|---|---|
|  | Neutralized L-lysine aqueous solution | Concentrated fermentation broth | Neutralized L-lysine aqueous solution | Concentrated fermentation broth | Neutralized L-lysine aqueous solution | Concentrated fermentation broth |
| Lysine ratio in mixed solution (%) | 100 | 0 | 90 | 10 | 80 | 20 |
| Molar ratio of $HCO_3^-$/L-lysine in mixed solution | 0.62 | | 0.54 | | 0.43 | |

TABLE 1-continued

| | Example 4 | | Example 5 | | Example 6 | |
|---|---|---|---|---|---|---|
| | Neutralized L-lysine aqueous solution | Concentrated fermentation broth | Neutralized L-lysine aqueous solution | Concentrated fermentation broth | Neutralized L-lysine aqueous solution | Concentrated fermentation broth |
| Lysine ratio in mixed solution (%) | 70 | 30 | 60 | 40 | 55 | 45 |
| Molar ratio of $HCO_3^-$/L-lysine in mixed solution | 0.32 | | 0.27 | | 0.19 | |

TABLE 2

| | Comparative Example 1 | | Comparative Example 2 | | Comparative Example 3 | |
|---|---|---|---|---|---|---|
| | L-Lysine aqueous solution | Concentrated fermentation broth | L-Lysine aqueous solution | Concentrated fermentation broth | L-Lysine aqueous solution | Concentrated fermentation broth |
| Lysine ratio in mixed solution (%) | 100 | 0 | 90 | 10 | 80 | 20 |
| Molar ratio of $HCO_3^-$/L-lysine in mixed solution | 0.04 | | 0.02 | | 0.02 | |

| | Comparative Example 4 | | Comparative Example 5 | | Comparative Example 6 | |
|---|---|---|---|---|---|---|
| | L-Lysine aqueous solution | Concentrated fermentation broth | L-Lysine aqueous solution | Concentrated fermentation broth | L-Lysine aqueous solution | Concentrated fermentation broth |
| Lysine ratio in mixed solution (%) | 70 | 30 | 60 | 40 | 55 | 45 |
| Molar ratio of $HCO_3^-$/L-lysine in mixed solution | 0.05 | | 0.03 | | 0.02 | |

As shown in Table 1, Examples 1 to 6 showed that as the ratio of the L-lysine aqueous solution decreased and the ratio of the concentrated fermentation broth increased, the molar ratio of $HCO_3$/L-lysine in the mixed solution decreased.

As shown in Table 2, Comparative Examples 1 to 6 showed no significant change in the molar ratio of $HCO_3^-$/L-lysine in the mixed solution according to the change in the ratio of L-lysine aqueous solution.

1.2. Preparation of Granular Feed Additive

Each of the mixed solutions prepared in 1.1. above was granulated. Specifically, the prepared mixed solution was granulated by injecting it into a fluidized bed circulation granulator at 5 mL/min, and spraying it into the granulator at 80° C. at a nozzle pressure of 1.2 kg/cm². The prepared granules were screened with a size of about 0.5 mm to 3.0 mm through sieving.

2. Characterization of Granular Feed Additive 2.1. Analysis of Molar Ratio of HCOs to L-Lysine and L-Lysine Content in Granules To analyze the molar ratio of $HCO_3^-$ to L-lysine and the L-lysine content in the granules of Examples 1 to 6 and Comparative Examples 1 to 6, a trace amount of granules was dissolved in 1 L of deionized water, followed by HPLC (Waters, 2478), and from the results, the molar ratio was calculated. The calculation results are shown in Tables 3 and 4 below.

TABLE 3

| | Example 1 | | Example 2 | | Example 3 | |
|---|---|---|---|---|---|---|
| | Neutralized L-lysine aqueous solution | Concentrated fermentation broth | Neutralized L-lysine aqueous solution | Concentrated fermentation broth | Neutralized L-lysine aqueous solution | Concentrated fermentation broth |
| Item | 100 | 0 | 90 | 10 | 80 | 20 |
| pH of granules | 9.2 | | 9.2 | | 9.0 | |
| L-Lysine content (%) | 81.6 | | 80.1 | | 80.6 | |
| Molar ratio of $HCO_3^-$/L-lysine in granules | 0.52 | | 0.47 | | 0.36 | |

TABLE 3-continued

|  | Example 4 | | Example 5 | | Example 6 | |
| --- | --- | --- | --- | --- | --- | --- |
| Item | Neutralized L-lysine aqueous solution 70 | Concentrated fermentation broth 30 | Neutralized L-lysine aqueous solution 60 | Concentrated fermentation broth 40 | Neutralized L-lysine aqueous solution 55 | Concentrated fermentation broth 45 |
| pH of granules | 8.9 | | 8.8 | | 8.7 | |
| L-Lysine content (%) | 79.5 | | 79.3 | | 79.7 | |
| Molar ratio of $HCO_3^-$/ L-lysine in granules | 0.25 | | 0.14 | | 0.10 | |

TABLE 4

|  | Comparative Example 1 | | Comparative Example 2 | | Comparative Example 3 | |
| --- | --- | --- | --- | --- | --- | --- |
| Item | L-Lysine aqueous solution 100 | Concentrated fermentation broth 0 | L-Lysine aqueous solution 90 | Concentrated fermentation broth 10 | L-Lysine aqueous solution 80 | Concentrated fermentation broth 20 |
| pH of granules | 10.2 | | 10.1 | | 9.8 | |
| L-Lysine content (%) | 98.4 | | 94.2 | | 90.2 | |
| Molar ratio of $HCO_3^-$/ L-lysine in granules | 0.02 | | 0.03 | | 0.03 | |

|  | Comparative Example 4 | | Comparative Example 5 | | Comparative Example 6 | |
| --- | --- | --- | --- | --- | --- | --- |
| Item | L-Lysine aqueous solution 70 | Concentrated fermentation broth 30 | L-Lysine aqueous solution 60 | Concentrated fermentation broth 40 | L-Lysine aqueous solution 55 | Concentrated fermentation broth 45 |
| pH of granules | 9.6 | | 9.4 | | 9.3 | |
| L-Lysine content (%) | 86.6 | | 83.2 | | 81.7 | |
| Molar ratio of $HCO_3^-$/ L-lysine in granules | 0.03 | | 0.02 | | 0.02 | |

As shown in Tables 3 and 4, the molar ratio of $HCO_3^-$ to L-lysine in the granules of Examples 1 to 6 and in the granules of Comparative Examples 1 to 6 was in the range of 0.1 to 0.52 and in the range of 0.02 to 0.03, respectively.

In addition, all of Examples 1 to 6 and Comparative Examples 1 to 6 showed the L-lysine content of 78% or more, indicating the high content.

2.2. Evaluation of Hygroscopicity and Solidification

To evaluate hygroscopicity and solidification of Examples 1 to 6 and Comparative Examples 1 to 6, 3 g of each granules was placed in a disposable mass plate and stored for 1 week at 40° C. and 60% relative humidity, and then moisture changes in the granules were measured through changes in the mass.

Additionally, in order to quantitatively evaluate an aggregation phenomenon (solidification) of granules that had absorbed moisture, the granules were transferred to a sieve with a 1.7 mm mesh size, and a vibrating device was used to vibrate (50 Hz condition, 5 minutes), and then mass of the granules that passed through the sieve was measured to determine the degree of agglomeration. The degree of agglomeration was calculated by the following equation.

Degree of agglomeration (%)=([total mass of granules]−[mass of granules that passed through sieve])/([total mass of granules])×100

The results are shown in Tables 5 and 6 below.

TABLE 5

|  | Example 1 | | Example 2 | | Example 3 | |
| --- | --- | --- | --- | --- | --- | --- |
| Item | Neutralized L-lysine aqueous solution 100 | Concentrated fermentation broth 0 | Neutralized L-lysine aqueous solution 90 | Concentrated fermentation broth 10 | Neutralized L-lysine aqueous solution 80 | Concentrated fermentation broth 20 |
| Moisture content after 1 week (%) | 2.7 | | 3.7 | | 4.4 | |
| Degree of agglomeration after 1 week (%) | 1.9 | | 2.1 | | 2.0 | |

TABLE 5-continued

| | Example 4 | | Example 5 | | Example 6 | |
|---|---|---|---|---|---|---|
| Item | Neutralized L-lysine aqueous solution 70 | Concentrated fermentation broth 30 | Neutralized L-lysine aqueous solution 60 | Concentrated fermentation broth 40 | Neutralized L-lysine aqueous solution 55 | Concentrated fermentation broth 45 |
| Moisture content after 1 week (%) | 5.4 | | 5.7 | | 6.9 | |
| Degree of agglomeration after 1 week (%) | 3.2 | | 2.9 | | 45.2 | |

TABLE 6

| | Comparative Example 1 | | Comparative Example 2 | | Comparative Example 3 | |
|---|---|---|---|---|---|---|
| Item | L-Lysine aqueous solution 100 | Concentrated fermentation broth 0 | L-Lysine aqueous solution 90 | Concentrated fermentation broth 10 | L-Lysine aqueous solution 80 | Concentrated fermentation broth 20 |
| Moisture content after 1 week (%) | 11.2 | | 10.3 | | 10.4 | |
| Degree of agglomeration after 1 week (%) | 99 | | 97 | | 98 | |

| | Comparative Example 4 | | Comparative Example 5 | | Comparative Example 6 | |
|---|---|---|---|---|---|---|
| Item | L-Lysine aqueous solution 70 | Concentrated fermentation broth 30 | L-Lysine aqueous solution 60 | Concentrated fermentation broth 40 | L-Lysine aqueous solution 55 | Concentrated fermentation broth 45 |
| Moisture content after 1 week (%) | 10.1 | | 10.1 | | 10.2 | |
| Degree of agglomeration after 1 week (%) | 96 | | 97 | | 95 | |

As shown in Tables 5 and 6, Examples 1 to 6 showed significantly lower moisture content and degree of agglomeration than Comparative Examples 1 to 6. In particular, when only the L-lysine aqueous solution was used (Comparative Example 1), the highest hygroscopicity was observed. In the compositions of Comparative Examples 1 to 6, as the ratio of the L-lysine aqueous solution increased, the hygroscopicity of granules increased, indicating that the polarity of purified L-lysine increases the hygroscopicity of granules.

In contrast, in the compositions of Examples 1 to 6, as the ratio of the neutralized L-lysine aqueous solution increased, the moisture content and the degree of agglomeration decreased. In other words, as the ratio of $HCO_3^-$ in the granules increased, the polarity of L-lysine was relieved, suggesting that the hygroscopicity of granules may be improved. In particular, when the molar ratio of $HCO_3^-$/L-lysine in the granules decreased to a level of 0.1 or less, the solidification sharply increased, indicating that the molar ratio of $HCO_3^-$/L-lysine should exceed 0.1 in order to solve the solidification problem.

Therefore, the compositions of Examples 1 to 6 confirmed that when the molar ratio of $HCO_3^-$ in the granules was more than 0.1 and 0.52 or less, the hygroscopicity of granules may be alleviated, thereby reducing the agglomeration phenomenon caused by moisture absorption.

Example 7. Preparation of Neutralized Amino Acid Aqueous Solution Using Bubbling Tower Each L-lysine aqueous solution was prepared using L-lysine as an example of basic amino acids in the same manner as described in 1.1 of Examples 1 to 6, and then the amino acid aqueous solution was neutralized using a bubbling tower device, as shown in FIG. 2. In detail, 35 kg of the L-lysine aqueous solution was put into a neutralization tank, a gas containing 5% by volume of carbon dioxide was injected at a temperature of 50° C. at 1000 L/min under stirring conditions at 500 rpm for 1.0, 1.5, 2.0, 2.5, 3.0, 4.0, 5.0, or 6.0 hours to prepare each neutralized L-lysine aqueous solution (neutralized amino acid aqueous solution). The neutralized L-lysine aqueous solution further included $HCO_3^-$ or $CO_3^{2-}$ in addition to the L-lysine aqueous solution. The $HCO_3^-$ or $CO_3^{2-}$ concentration was analyzed using HPLC (Waters, 2478). Changes in the physical properties of the L-lysine aqueous solution according to the injection time of carbon dioxide are shown in Table 7.

TABLE 7

| Hours (h) | pH | Specific gravity | Purity (%) | $HCO_3^-$ (g/L) |
|---|---|---|---|---|
| 1.0 | 10.18 | 1.13 | 96.5 | 7.6 |
| 1.5 | 10.05 | 1.14 | 93.6 | 26.3 |
| 2.0 | 9.87 | 1.15 | 91.2 | 41.6 |
| 2.5 | 9.73 | 1.16 | 90.0 | 65.5 |
| 3.0 | 9.66 | 1.17 | 89.3 | 69.0 |
| 4.0 | 9.50 | 1.18 | 87.4 | 87.1 |
| 5.0 | 9.37 | 1.19 | 83.6 | 109.3 |
| 6.0 | 8.90 | 1.20 | 81.8 | 118.1 |

As shown in Table 7, it was confirmed that as the injection time of carbon dioxide increased, the pH and purity of the L-lysine aqueous solution decreased, and the specific gravity and the HCOs ion concentration in the aqueous solution increased. It was also confirmed that when carbon dioxide was injected for up to 6 hours according to the above conditions, the high-content basic amino acid aqueous solution having a purity of 81.8% was prepared.

Examples 8 to 13. Preparation of Granular Feed Additive Using Bubbling Tower and Characterization (2)

1. Preparation of Granular Feed Additive

Each L-lysine aqueous solution was prepared using L-lysine as an example of basic amino acids in the same manner as described in 1.1 of Examples 1 to 6, and then each neutralized amino acid aqueous solution was prepared in the same manner as in Example 7, except that gas containing carbon dioxide was injected for 1, 4, 5, 6, 10, or 20 hours using a bubbling tower device, as shown in FIG. 2. Thereafter, each neutralized L-lysine aqueous solution was granulated by injecting it into a fluidized bed circulation granulator at 5 mL/min to 10 mL/min, and spraying it into the granulator at 75° C. to 80° C. at a nozzle pressure of 1.2 kg/cm$^2$. The prepared granules were screened with a size of about 0.5 mm to 1.5 mm through sieving.

2. Characterization of Granular Feed Additive

The granules prepared in 1 were dissolved in deionized water (0.9 μS/cm), and the L-lysine and bicarbonate ion concentrations in the granules were analyzed by HPLC (Waters, 2478). In addition, the degree of agglomeration was visually evaluated after storing the granules at a temperature of 40° C. and 60% relative humidity for 1 week. The results are shown in Table 8.

each neutralized amino acid aqueous solution was prepared using a circulating absorption tower. FIG. 3 illustrates a method of neutralizing the amino acid aqueous solution using the circulating absorption tower. Hereinafter, each step will be described in detail with reference to FIG. 3.

Each L-lysine aqueous solution was prepared in the same manner as in 1.1 of Examples 1 to 6, and then a neutralized L-lysine aqueous solution was prepared by injecting a gas containing carbon dioxide. In detail, 35 kg of the lysine aqueous solution which was heated to 50° C. was circulated inside the absorption tower by applying it from the upper part to the lower part of the absorption tower at a rate of 60 kg/h, and at the same time, a gas containing 5% by volume of carbon dioxide was injected at 1000 L/min into the lower part of the absorption tower. A tray-type absorption tower including a structured packing (TPT Pacific; Surface Area 250 m$^2$/m$^3$) of 158.4 mm in diameter and 6400 mm in height (12 columns) was used.

As a result, it was confirmed that 2 hours was taken for the L-lysine aqueous solution to reach pH of 8.9. In other words, when carbon dioxide was injected using the circulating absorption tower, the basic amino acid may be neutralized about 3 times faster due to the increased gas-liquid contact area than those prepared by using the bubbling tower device as in Examples 1 to 13.

TABLE 8

|  | L-Lysine hydrochloride (Comparative Example 7) | Example 8 | Example 9 | Example 10 | Example 11 | Example 12 | Example 13 |
| --- | --- | --- | --- | --- | --- | --- | --- |
| Input time of carbon dioxide during neutralization | — | 1 hour | 4 hours | 5 hours | 6 hours | 10 hours | 20 hours |
| pH | 5.8 | 10.2 | 9.5 | 9.3 | 9.0 | 8.5 | 8.0 |
| L-Lysine content (%) | 78.9 | 97.5 | 90.9 | 87.7 | 85.6 | 78.5 | 75.0 |
| Bicarbonate ion content (%) | 0.0 | 0.6 | 7.2 | 10.4 | 12.7 | 19.6 | 23.1 |
| Degree of agglomeration (good: 0-poor: 5) | 1 | 5 | 5 | 3 | 1 | 0 | 0 |

As shown in Table 8, in the granules prepared after neutralization of L-lysine by injecting carbon dioxide, the content of L-lysine in the granules decreased, and the content of bicarbonate ions increased, as neutralization proceeded (pH decrease). Specifically, when neutralization was performed to pH 9.0 by injecting carbon dioxide, the granules were prepared with the high content of L-lysine, as compared with L-lysine hydrochloride (79% content), and at pH 8.5, the granules were prepared with the content of L-lysine at the same level as L-lysine hydrochloride. However, when the granules were prepared at pH 9.3 or higher, the degree of agglomeration due to moisture absorption was inferior, as compared to L-lysine hydrochloride, indicating that the appropriate level of the L-lysine content and the problem of aggregation may be solved at the same time in the pH range of 8.5 to 9.3.

Example 14. Preparation of Neutralized Amino Acid Aqueous Solution Using Circulating Absorption Tower To increase a neutralization rate of the amino acid aqueous solution in the preparation of the granular feed additive,

Example 15. Preparation of Neutralized Amino Acid Aqueous Solution Using Continuous Absorption Tower In order to continuously obtain a neutralized amino acid aqueous solution with predetermined physical properties in the preparation of the granular feed additive, the neutralized amino acid aqueous solution was prepared using a continuous absorption tower. FIG. 4 illustrates a method of neutralizing the amino acid aqueous solution using the continuous absorption tower. Hereinafter, each step will be described in detail with reference to FIG. 4.

Each L-lysine aqueous solution was prepared in the same manner as in 1.1 of Examples 1 to 6, and each neutralized L-lysine aqueous solution was prepared by injecting a gas containing carbon dioxide. In detail, the L-lysine aqueous solution (a concentration of 560 g/L, pH of 10.2, a specific gravity of 1.13, a purity of 95% by weight) which was heated to 50° C. was applied at 30 kg/h, and the injection rate of gas containing 5% carbon dioxide was controlled. The physical properties of the L-lysine aqueous solution discharged from the continuous absorption tower in a steady state according to the gas injection rate are shown in Table 9.

TABLE 9

| Gas injection rate | 1000 L/min | 500 L/min | 100 L/min |
|---|---|---|---|
| pH of L-lysine aqueous solution | 8.8 | 9.0 | 9.8 |
| Purity of L-lysine aqueous solution (%) | 80 | 83 | 92 |
| Bicarbonate ion concentration in L-lysine aqueous solution (g/L) | 122 | 111 | 40 |

As a result, as shown in Table 9, as the injection rate of gas containing carbon dioxide increased, the pH and purity of the L-lysine aqueous solution which was discharged at a steady state decreased, and the concentration of bicarbonate ions increased. In particular, when the gas was injected at 1000 L/min, pH of the discharged L-lysine aqueous solution was 8.8, the concentration of bicarbonate ion was 122 g/L, and the purity was 80%, which is a high content level similar to that of L-lysine hydrochloride. Based on the above results, when the continuous absorption tower is used, it is possible to obtain the neutralized amino acid aqueous solution having the desired range of pH or purity by controlling the gas injection rate.

Effect of the Invention

When a method of preparing a granular feed additive according to one exemplary embodiment is used, it is possible to prepare a granular feed additive including a high content of basic amino acids while preventing hygroscopicity and agglomeration caused by the basic amino acids. In addition, since the method of preparing a granular feed additive according to one exemplary embodiment may omit a process of using hydrochloric acid, which is generally used to neutralize basic amino acids, it is possible to simplify the process and to solve process problems caused by the use of hydrochloric acid.

What is claimed is:

1. A method of preparing a granular feed additive, the method comprising steps of:
   preparing a basic amino acid aqueous solution that comprises a basic amino acid (step a); and
   injecting carbon dioxide into the basic amino acid aqueous solution to prepare a neutralized amino acid aqueous solution (step b),
   wherein the basic amino acid aqueous solution is prepared from a fermentation broth obtained from microbial culture, and wherein pH of the neutralized amino acid aqueous solution is 8.5 to 9.5.

2. The method of claim 1, wherein the carbon dioxide includes carbon dioxide generated in the step a.

3. The method of claim 1, further comprising a step of preparing a concentrated fermentation broth by concentrating the fermentation broth (step a-2), after the step a.

4. The method of claim 3, further comprising a step of mixing the concentrated fermentation broth and the neutralized amino acid aqueous solution (step b-2) to generate a mixed solution of the concentrated fermentation broth and the neutralized amino acid aqueous solution, after the step b.

5. The method of claim 1, further comprising a step of granulating the neutralized amino acid aqueous solution (stop c), after the step b.

6. The method of claim 4, further comprising a step of granulating the mixed solution of the concentrated fermentation broth and the neutralized amino acid aqueous solution (step c-2), after the step b-2.

7. The method of claim 1, wherein the microbial strain is a bacterial strain of the genus *Corynebacterium*.

8. The method of claim 1, wherein pH of the basic amino acid aqueous solution is 10.0 to 11.0.

9. The method of claim 1, wherein a purity of the basic amino acid aqueous solution is 90% by weight to 100% by weight.

10. The method of claim 1, wherein a specific gravity of the basic amino acid aqueous solution is 1.10 to 1.15.

11. The method of claim 1, wherein the basic amino acid is one or more selected from the group consisting of lysine, arginine, and histidine.

12. The method of claim 1, wherein, in the step b, a bubbling tower, circulating absorption tower, or continuous absorption tower device is used.

13. The method of claim 1, wherein the step b is performed at 35° C. to 65° C.

14. The method of claim 1, wherein a specific gravity of the neutralized amino acid aqueous solution is 1.18 to 1.22.

15. The method of claim 1, wherein the granular feed additive includes a basic amino acid and an anion represented by the following Formula 1, and a molar ratio of the anion to the basic amino acid is more than 0.1 and 0.52 or less:

$$H_nCO_3^{(2-n)-} \quad \text{[Formula 1]}$$

(in Formula 1, n is 0 or 1).

16. The method of claim 1, wherein an average diameter of the granules of the granular feed additive is 0.1 mm to 3.0 mm.

17. The method of claim 1, wherein the content of the basic amino acid in the granular feed additive is 50% by weight to 90% by weight, based on the total weight of the granules of the granular feed additive.

* * * * *